Oct. 21, 1969 T. W. CONRAD 3,474,217
WELDING ACCESSORY

Filed March 21, 1966 2 Sheets-Sheet 1

INVENTOR.
THOMAS W. CONRAD
By Gordon H. Olson
ATTORNEY.

Oct. 21, 1969   T. W. CONRAD   3,474,217
WELDING ACCESSORY
Filed March 21, 1966   2 Sheets-Sheet 2
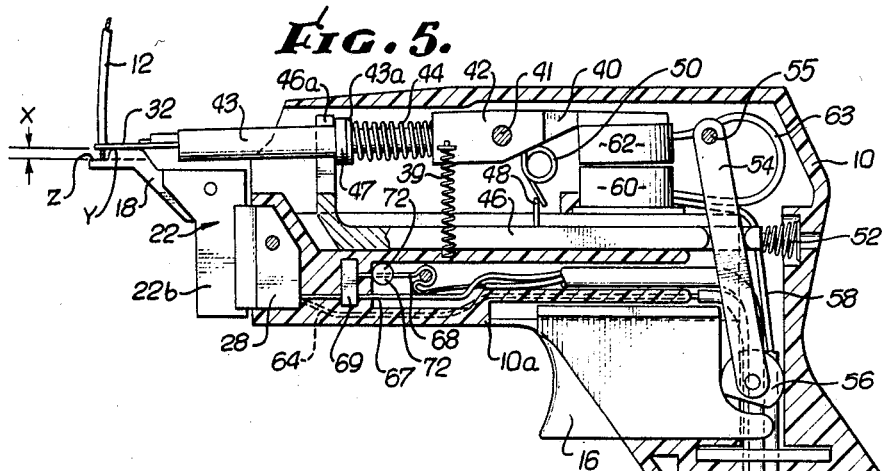
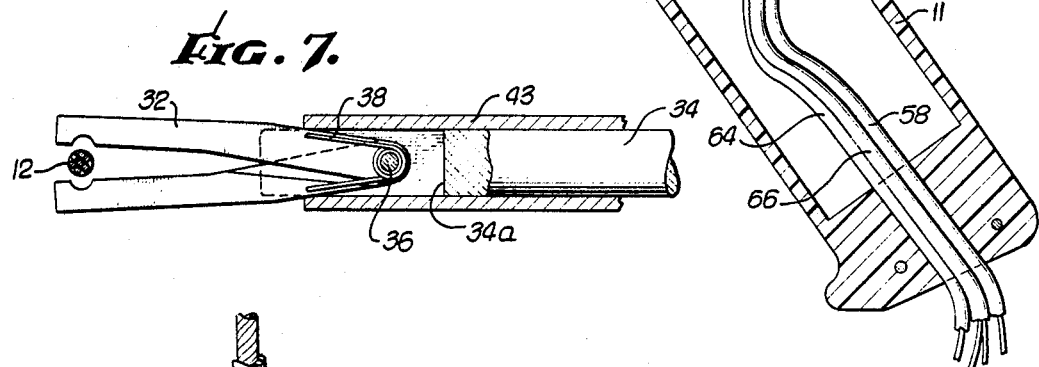
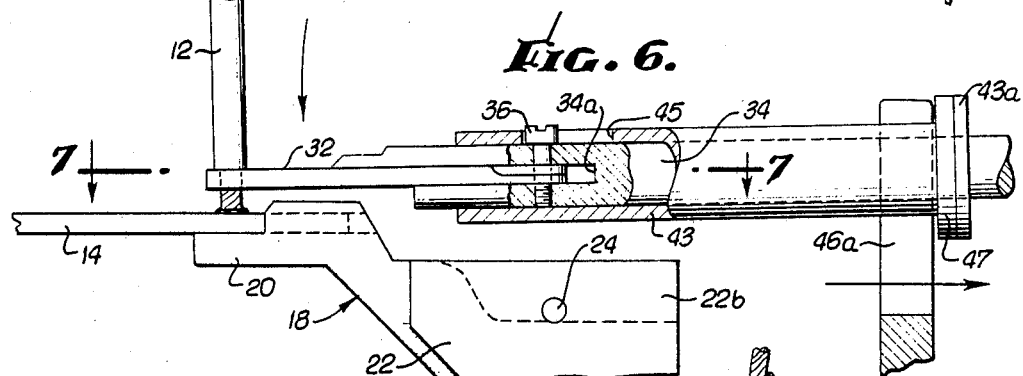
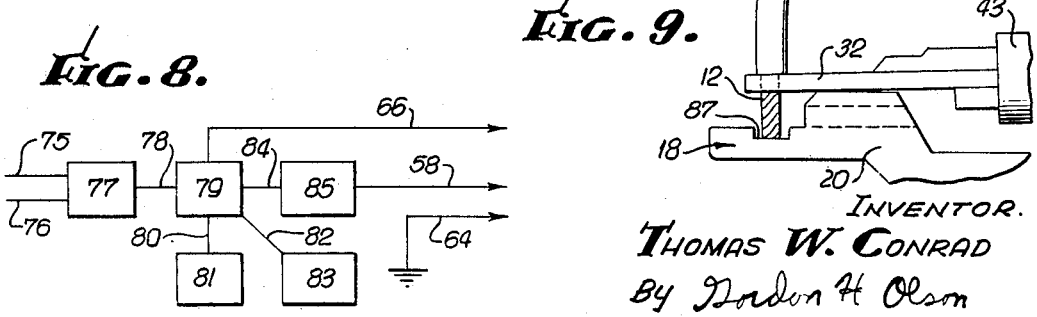
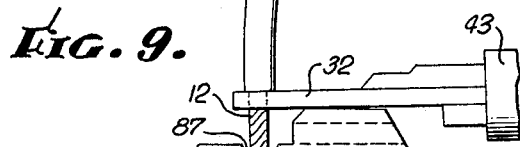
INVENTOR.
THOMAS W. CONRAD
BY Gordon H. Olson
ATTORNEY.

United States Patent Office 3,474,217
Patented Oct. 21, 1969

3,474,217
WELDING ACCESSORY
Thomas W. Conrad, Altadena, Calif., assignor, by mesne assignments, to The Sippican Corporation, Marion, Mass., a corporation of Massachusetts
Filed Mar. 21, 1966, Ser. No. 535,801
Int. Cl. B23k 9/22
U.S. Cl. 219—95    12 Claims

ABSTRACT OF THE DISCLOSURE

An arc-percussive welding apparatus for welding small electrical conductors. The apparatus includes an anvil for receiving a contact terminal and a movable support gripping another conductor. The movable support is held in a first position away from the anvil by spring means with the gripping means closed. Trigger means is used to position the movable support in a second position closer to the anvil and to open normally closed gripping means in order to receive and grip a wire conductor. A reference surface on the anvil is engaged by the wire when being received and gripped by the movable support for predetermining a gap between conductors when the movable support is returned to its first position.

---

The present invention relates to arc welding apparatus and more particularly to an improved tool or accessory useful with arc-percussive welding, wherein the welding electrodes or items to be welded are driven together so that their adjacent surfaces which have been melted by the arc are forged together for an improved weld connection.

Arc percussive welding has been very useful in the joining of small electrical conductors; however, it has been somewhat difficult to weld an end of a relatively small wire, especially a stranded wire, to another member such as a contact terminal for an electrical connector. Not only are these weld members difficult to support in proper alignment for making the weld, but the electrode spacing is a more delicate operation than in many other welding situations. The proper gap between the two electrodes must be very accurate if the type of percussive arc welding is employed wherein the arc is established before the electrodes are moved together. Hence, it is highly desirable that the accessory for accomplishing this necessary function be reliable and easy to operate.

Controlling the amount of the stranded wire extending from its support structure is quite critical in that there are several adverse factors resulting from improper length. If the extension is too long, the columnar strength of a stranded wire is inadequate and it will buckle outwardly under the percussive force causing a "bird cage" effect. If the extension is too short, the structure supporting the wire may become welded to the other weld member or more likely, the support will draw too much heat from the weld area resulting in a weak joint. The length of the extension is also important from a standpoint of the proper formation and flow of the arc and the total resistance in the welding circuit.

In view of the foregoing, it is a primary object of this invention to provide an improved arc-percussive welding apparatus for quickly and accurately establishing the proper gap between two weld members and the proper extension length of the members.

Another object of the invention is to provide a welding accessory of such type having an improved positive grounding means without maintaining accurate machining tolerances.

It is another object of this invention to provide an improved arc-percussive welding accessory particularly adapted to weld small electrical conductors employed in confined spaces.

Briefly stated, the welding accessory of the invention includes an anvil for receiving a conductor, such as a contact terminal, and a movable support including normally closed means for gripping another conductor, such as a stranded wire, to be welded to the contact terminal. Spring means are provided for holding the movable support means in a first position spaced from the anvil and a trigger structure is employed for moving the movable support from its first position to a second position closer to the anvil. When in the second position, further movement of the trigger means opens the normally closed gripping means to receive and grip the wire conductor. During this operation, the end of the wire engages a reference surface preferably on the anvil so that a predetermined gap is established between the two conductors when the movable support means is returned to its first position. Thus, by determining in advance the gap desired and the extension length of the wire beyond the gripping means, the accessory may be easily adjusted to produce reliably and accurately the desired parameters.

Further features, objects and attendant advantages will become apparent with reference to the following description and drawings in which:

FIG. 5 is a view similar to that of FIG. 1 with the accessory in operated position;

FIG. 6 is an enlarged view of a forward portion of the accessory at the completion of a welding operation;

FIG. 7 is a plan view along 7—7 of FIG. 6;

FIG. 8 is a schematic of a welding circuit for use with the accessory of the invention; and FIG. 9 is a side elevational view of a slightly modified anvil.

Figure 1:
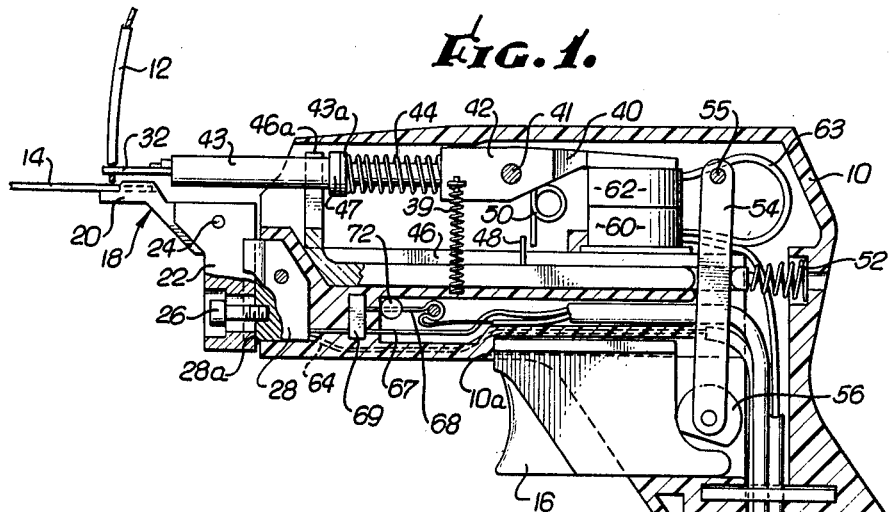
FIG. 1 is a side elevational, partially sectionalized view of the welding accessory of the invention.

Referring now to the drawings and first to FIG. 1, the welding accessory of the invention can be seen to be supported in a casing 10 made of insulated material and having the overall shape of a gun conveniently adapted to be held in the operator's hand. The unique mechanism to be described may, of course, be mounted in fixtures; however, the primary use of the device is for welding small electrical connectors wherein the freedom of movement is very desirable and often essential. Briefly, the gun includes fixed means for supporting a wire electrode 12, movable means for gripping and supporting a terminal electrode 14 to be welded to the wire, a trigger 16, for operating the movable means, and portions of the electrical circuitry for providing the welding power.

The fixed supporting means includes anvil 18 formed of mating members 19 and 20, preferably made of a heat treatable spring alloy. These members are clamped together in face-to-face relation as their rear portions extend between the bifurcated arms 22a and 22b of a mounting block 22. A fastener 24 extending through the block above the anvil members tensions the bifurcated arms so that the rear of the members 19 and 20 are tightly held. The mounting block 20 is removably secured by fasteners 26 to slide member 28 attached to casing 10. Note from FIG. 1 that member 28 is formed with a vertically extending slide or groove 28a for receiving block member 22 so that the block, and hence the anvil, is vertically adjustable.

Figure 4:
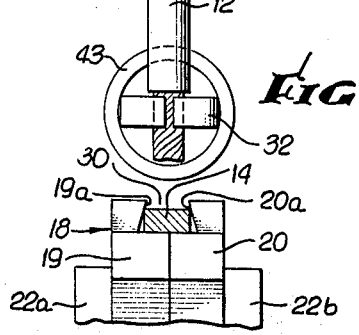
FIG. 4 is an end view along 4—4 of FIG. 2.

The upper portion of each anvil member 19 and 20 is formed with a groove on its inner corner so that the two grooves together form an elongated space 30 for receiving the terminal 14 to be welded, as best seen in FIG. 4. The side walls 19a and 20a defining space 30 slope toward each other as they extend upwardly from the bottom wall of the space. Hence, the space generally has the cross-sectional shape of a trapezoid.

Since the members are secured at their rearward ends in somewhat cantilever fashion, the forward portions defining the space 30 may be resiliently forced outwardly a small amount by a terminal 14 having a width slightly greater than that of the space at the line of contact between the terminal and the side walls of the space. The resulting pincer action insures positive contact against the side walls. Also, by employing the trapezoidal shape, the terminal is forced downwardly by the sloping side walls to sit squarely on the bottom wall of the space and positively engage the wall or surface. The result of these two features is that excellent electrical contact is made between the anvil 18 and the terminal electrode. This, of course, enhances the welding operation.

With the anvil construction described, it is not necessary to maintain precise tolerance on the terminal to be inserted in the anvil. This avoids loose fitting terminals which would cause inter-arcing between the terminal and the anvil thus robbing the actual weld of part of its heat. Loose fitting terminals with slight oxide can cause a condition wherein virtually the entire arc will be discharged as an inter-arc.

Figure 2:
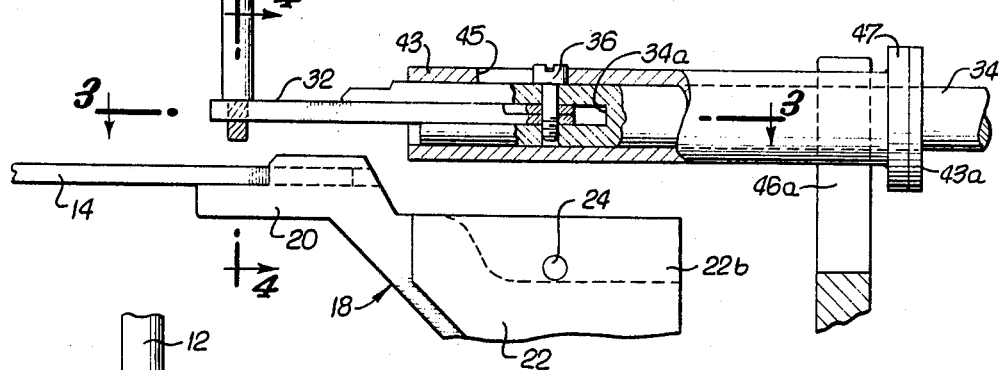
FIG. 2 is an enlarged elevational sectionalized view of the forward portion of the accessory of FIG. 1.

Turning now to the movable means for supporting the wire electrode 12, there is shown in the drawing a pair of movable arms or grippers 32 having their forward portion adapted to grip the wire 12. As seen in FIG. 6, the rear portions of the grippers 32 extend into slot 34a formed in the forward end of rod 34 and are pivotally mounted on the rod by means of a screw 36. A spring 38 or other resilient means urges the grippers outwardly into an open position. The rod 34 forms the forward portion of, or is secured to, a lever 40 extending rearwardly into the casing and being pivotally mounted therein by a pin 41 extending through an enlarged portion 42 of the lever and fixed to the casing. Since the pin 41 extends horizontally as shown, the lever 40 is movable in a vertical plane so that the gripper 32 can be tilted toward or away from anvil 18. A spring 39 extending between the casing 10 and lever 40 forwardly from pivot pin 41 urges the lever in a clockwise position so that grippers 32 are normally spaced from anvil 18 in the upper position as seen in FIGS. 1 and 2.

Figure 3:
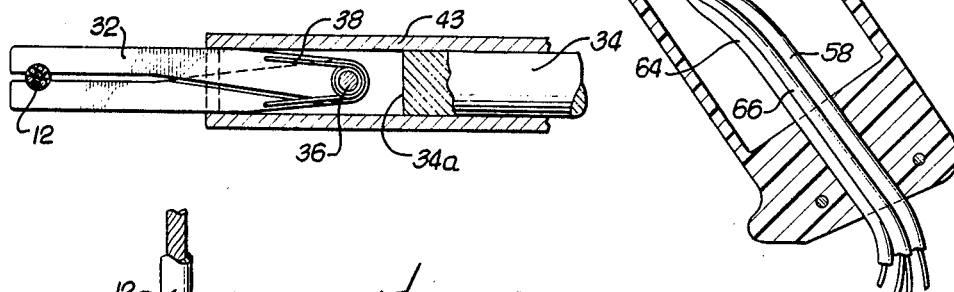
FIG. 3 is a plan, sectionalized view of the gripping section of the accessory along 3—3 of FIG. 2.

To control the movement of grippers 32, there is provided a sleeve or collet 43 slidably mounted on rod 34 with the forward portion of the sleeve surrounding the rear portions of grippers 32. A spring 44 mounted on rod 34 and extending between a flange 43a on sleeve 43 and the enlarged portion 42 normally urges the sleeve 43 forwardly to the position shown in FIGS. 1, 2, and 3, wherein the grippers 32 are held in a closed position by the sleeve. As seen in FIG. 2, a slot 45 in sleeve 43 permits axial movement of the sleeve on rod 34.

An elongated drawbar 46 having a somewhat L-shape slidably mounted within casing 10 is designed to slide rearwardly to pivot or tilt the forward end of lever 40 downwardly and to move sleeve 43 rearwardly to permit grippers 32 to open. A pin 48 extending upwardly from the drawbar 46 engages a spring member 50 extending downwardly from lever 40 to permit the lever to be pivoted. The forward portion 46a of drawbar 46 extends upwardly to form a fork or bifurcated portion which straddles sleeve 43 in front of insulated washer 47 and flange 43a to engage the washer as the drawbar is moved rearwardly. Note that fork 46a is slightly spaced from the washer in the rest position shown in FIG. 1.

A spring 52 engaging the rear of drawbar 46 and the adjacent casing surface urges the drawbar forwardly. To slide the drawbar rearwardly, there is provided a linking lever 54 pivotally mounted at its upper end to casing 10 by a pin 55. The lever 54 extends downwardly to engage drawbar 46 in a manner to be able to move the drawbar rearwardly and the lower end of lever 54 carries a roller 56 which engages trigger 16. The trigger is in turn slidably mounted in the handle 11 of casing 10. Shoulder 10a limits forward movement of the trigger and spring 52 urges the trigger against the shoulder.

The arc-percussive welding circuitry with which the accessory of the invention is primarily designed to be used is generally known. An example of such circuitry is schematically shown in FIG. 8 to include A.C. input leads 75 and 76 leading to a power supply circuit 77, conductor 76 connected to a trigger relay 79, conductor 80 connecting the relay to a welding capacitor bank 81, conductor 82 connecting the trigger relay to an R.F. circuit 83, and conductor 84 joining the trigger relay to an output transformer 85.

The electrical circuitry included in the welding accessory comprises a power input conductor 58 leading from output transformer 85 of FIG. 8, which provides the necessary arc producing voltage, to a pair of electromagnets 60 and 62 connected by conductor 63 in opposing relation. Electromagnet 60 is mounted to casing 10 while electromagnet 62 is mechanically secured and electrically connected to the end of lever 40. Lever 40 is, of course, connected to wire 12 through grippers 32, and the arc to be produced is to connect electrically terminal 14 to wire 12, anvil 18 supporting terminal 14 is connected to ground connector 64.

To trigger the welding circuit, there is employed a cable 66 carrying conductors 67 and 68 which are connected to trigger relay 79 in the circuit of FIG. 8. Conductors 67 and 68 are connected to a normally open switch 69 including button 72 slidably mounted in casing 10 to be actuated by the operator's fingers pressing against the end of the button.

OPERATION

While the general operation of the gun is perhaps largely understood by the structural description, the detailed operative steps will now be set forth.

As a first step, it is necessary to calculate the gap desired between the items to be welded and the extension of wire 12 extending beyond grippers 32. The anvil must be selected or adjusted accordingly. These initial mechanical adjustments will be more easily understood after a description of the welding operation.

As the next step of the operation, trigger 16 is depressed rearwardly causing linking lever 54 to pivot and drawbar 46 to move rearwardly against the urging of spring 52. As shown in FIG. 5, this causes pin 48 to engage spring member 50 and pivot lever 40 against spring 39 so that grippers 32 are moved downwardly until they engage a suitable fixed reference surface, such as the top surface of anvil 18. As the wire grippers engage the anvil, at approximately point Y shown in FIG. 5, fork 46a on drawbar 46 engages washer 47 backed by sleeve flange 43a moving the washer and sleeve 43 rearwardly, thus allowing grippers 32 to open in response to the urging of spring 38. Note that spring member 50 permits this further rearward movement of drawbar 46 after the lever 40 is tilted to the position in which the grippers 32 engage anvil 18.

While in this position, wire 12 may be inserted between grippers 32 until the end of the wire engages the reference surface Z on the bottom wall of the anvil space which is to receive terminal 14. Releasing trigger 16 causes the above outlined steps to be reversed so that grippers 32 grip wire 12 while the grippers and the end of wire 12 still engage the anvil reference surfaces Y and Z respectively. Lever 40 then pivots to its at rest position with the grippers spaced from anvil 18. At this point, anvil 18 is placed over the terminal 14 to be welded, as shown in FIGS. 1 and 2. In this fashion wire 12 is uniquely automatically spaced from terminal 14 a predetermined desired amount, and the amount of wire 12 extending beyond grippers 32 is automatically set.

From the foregoing, it will be seen from FIG. 5 that the length of wire extension 12a is determined by the vertical dimension X between the reference surface Y on the upper portion of anvil 18 contacted by the grippers when trigger 16 is depressed and the reference surface Z on the lower portion of the anvil contacted by the end of wire 12. In the example of the invention illustrated, surface Z is common to the surface on which the terminal 14 rests on the bottom wall of space 30. If a different wire extension is desired, either of the surfaces Y or Z could be adjusted; however, the preferred approach is to fabricate the anvil so that the X dimension is at a desired minimum and then machine a transverse slot 87 in the lower surface of the anvil at the point where the end of wire 12 is to contact the anvil as illustrated in FIG. 9. Hence, the result is that such a reference surface Z would be lower than the adjacent surface upon which terminal 14 would rest. This then is one of the preliminary mechanical adjustments which must be made.

The other adjustment needed is for the proper setting of the gap between the end of wire 12 and terminal 14. The desired setting can be calculated and then made by simply adjusting the vertical position of the anvil since the upward movement of grippers 32 is determined by the parameters of the gun structure, such as the engagement of electromagnets 60 and 62 limiting the tilting of lever 40 and hence the grippers.

One of the features of the welding accessory is that it is suited for use in connection with two different types of arc-percussive welding. In one type, the welding arc is struck when the wire 12 is held by the grippers 32 in the at rest position as shown in FIG. 1, and thus requires accurate setting of the gap. Such an approach as illustrated in FIG. 8, utilizes an RF pulse to ionize the gap between the items being welded. Hence, depressing switch button 72 causes the RF pulse to be applied across the gap along with the welding current to produce the desired arc and localized melting of wire 12 and terminal 14. Simultaneously, the electromagnets 60 and 62, being in series with the weld current, are energized; and since they are in opposing relation electromagnet 60 is repulsed from electromagnet 62 causing lever 40 to tilt forcing wire 12 against terminal 14 to obtain the desired percussive action. By depressing trigger 16, the wire 12 welded to terminal 14 may be removed from the accessory.

In another type of arc-percussive welding, the circuitry is similar to that of FIG. 8 except that the RF pulse circuit is eliminated. The welding arc is not intended to be struck until the gap between terminal 14 and wire 12 is decreased from an initial at rest position of the gun. Hence, a two step operation of the gun is required. First switch button 72 is depressed applying the welding current but the arc is not struck. At the same time, trigger 16 is depressed causing wire 12 to be moved toward terminal 14, in the manner described above. At some point during this mechanical advance, an arc discharge will occur, heating the wire and terminal; and the force applied by the series wired opposing electro-magnets will create the percussive action. As with the RF pulse welding approach, the welding cycle is completed by depressing trigger 16 to cause the wire to be released and thus permitting the terminal 14 to be removed from anvil 18.

From the foregoing, it can be seen that a unique and versatile welding accessory has been described which permits the desired gap and wire extension to be easily and accurately set while being operative for both of the above-referenced welding approaches. While the gun is particularly well suited for use in welding a small contact wire to a small terminal as illustrated, it should, of course, be understood that the wire grippers 32 and the anvil 18 may be appropriately modified to weld other elements in a variety of situations. It should also be understood that the invention is not limited to the particular mechanical arrangement employed within the gun in that various changes and modifications will readily come to mind. Hence, it is intended that all such changes and modifications which fall within the true scope of the invention shall be included in the appended claims.

What is claimed is:

1. A welding accessory comprising: an anvil for receiving a first conductor; movable support means for receiving a second conductor to be welded to said first conductor; said movable support means including normally closed means for gripping said second conductor; said movable support means having a normal first position spaced from said anvil and being movable from said first position to a second position closer to said anvil; trigger means for moving said movable support means from said first position to said second position and for opening said gripping means after said support means is in said second position; and whereby said support means returns to its first position with said gripping means closed whenever said trigger means is released; a reference surface on said anvil to be engaged by said second conductor when the second conductor is being received and gripped by said gripping means whereby a predetermined gap exists between said second conductor and said anvil when said trigger means is released and said movable support means is returned to its first position.

2. The invention of claim wherein said gripping means includes a pair of pivotally mounted arms;
   resilient means urging said arms apart; and
   means normally holding said arms in closed relation; said holding means being movable to permit said resilient means to open said arms.

3. The invention of claim 1 including a supporting casing; said movable support means includes a lever pivotally mounted in said casing carrying said gripping means on its outer extremity whereby said gripping means is pivotally movable from said first position towards said anvil to said second position.

4. The invention of claim 3 including spring means for holding said movable support in said first position, means linking said trigger means to said lever for pivoting said lever from said first position against the urging of said spring means to said second position upon actuation of the trigger means.

5. The invention of claim 1 wherein said reference surface is the surface on which said first conductor rests during the welding operation.

6. A welding accessory comprising: an anvil for receiving a first conductor; movable support means for receiving a second conductor to be welded to said first conductor; said movable support means including normally closed means for gripping said second conductor; said movable support means being movable from a first position spaced from said anvil to a second position closer to said anvil; trigger means for moving said movable support means from said first position to said second position and for opening said gripping means after said support means is in said second position, a reference surface on said anvil to be engaged by said second conductor when the second conductor is being received and gripped by said gripping means whereby a predetermined gap exists between said second conductor and said anvil when said trigger means is released and said movable support means is returned to its first position, a supporting casing, said movable support means including a lever pivotally mounted in said casing carrying said gripping means on its outer extremity whereby said gripping means is pivotally movable from said first position towards said anvil to said second position; a drawbar assembly slidably mounted in said casing in a direction roughly parallel to said lever, a pin on said drawbar assembly extending toward said lever, a spring member extending from said lever toward said drawbar assembly, said spring member being normally spaced from said pin but in the path of said pin as the drawbar assembly is moved whereby said lever is pivoted from said first position to said second position, and means linking said drawbar assembly to said triggering means for sliding said drawbar assembly.

7. The invention of claim 6 including a sleeve assembly slidably mounted on said lever between its pivot and said gripping means; said sleeve assembly including a sleeve surrounding the lever for controlling said gripping means, a flange formed on the rear of said sleeve and a spring urging said sleeve forwardly;

said drawbar assembly including a forwardly extending forked portion for moving said sleeve rearwardly as said drawbar assembly is moved rearwardly upon actuation of said trigger means.

8. A welding accessory comprising: an anvil for receiving a first conductor; movable support means for receiving a second conductor to be welded to said first conductor; said movable support means including normally closed means for gripping said second conductor; said movable support means being movable from a first position spaced from said anvil to a second position closer to said anvil; trigger means for moving said movable support means from said first position to said second position and for opening said gripping means after said support means is in said second position; and a reference surface on said anvil to be engaged by said second conductor when the second conductor is being received and gripped by said gripping means whereby a predetermined gap exists between said second conductor and said anvil when said trigger means is released and said movable support means is returned to its first position, said gripping means engaging said anvil at a point spaced above said reference surface when said movable support means is in said second position.

9. A welding accessory comprising: an anvil for receiving a first conductor; movable support means for receiving a second conductor to be welded to said first conductor; said movable support means including normally closed means for gripping said second conductor; said movable support means being movable from a first position spaced from said anvil to a second position closer to said anvil; trigger means for moving said movable support means from said first position to said second position and for opening said gripping means after said support means is in said second position; a reference surface on said anvil to be engaged by said second conductor when the second conductor is being received and gripped by said gripping means whereby a predetermined gap exists between said second conductor and said anvil when said trigger means is released and said movable support means is returned to its first position, and a transverse slot formed in said anvil, the bottom surface of said slot forming said reference surface and being located below the surface on which said first conductor rests during the welding operation.

10. A welding accessory comprising; an anvil for receiving a first conductor; movable support means for receiving a second conductor to be welded to said first conductor; said movable support means including normally closed means for gripping said second conductor; said movable support means being movable from a first position spaced from said anvil to a second position closer to said anvil; trigger means for moving said movable support means from said first position to said second position and for opening said gripping means after said support means is in said second position; and a reference surface on said anvil to be engaged by said second conductor when the second conductor is being received and gripped by said gripping means whereby a predetermined gap exists between said second conductor and said anvil when said trigger means is released and said movable support means is returned to its first position, said anvil including a pair of spring metal members held in contact by a fastener clamping the rear portion of said members; said members being joined to provide a space for receiving said first conductor; the forward portions of said members being adapted to be forcibly separated slightly by insertion of said first conductor whereby good electrical contact between the conductor and said anvil is attained.

11. The invention of claim 10 wherein said space is open to the front and top surfaces of said anvil and is defined by a bottom wall and opposing side walls which converge upwardly toward the top surface.

12. The invention of claim 11 wherein said bottom wall forms said reference surface.

References Cited

UNITED STATES PATENTS

| 2,921,177 | 1/1960 | Gellatly et al. | 219—95 |
| 3,244,853 | 4/1966 | Dobrjansky | 219—95 |
| 2,878,362 | 3/1959 | Quinlan | 219—95 X |

JOSEPH V. TRUHE, Primary Examiner

M. C. FLIESLER, Assistant Examiner

U.S. Cl. X.R.

219—78

PO-1050
(5/69)

UNITED STATES PATENT OFFICE
CERTIFICATE OF CORRECTION

Patent No. 3,474,217                     Dated  October 21, 1969

Inventor(s) THOMAS W. CONRAD

It is certified that error appears in the above-identified patent and that said Letters Patent are hereby corrected as shown below:

Column 6, line 27, after "claim" insert -- 1 --.

SIGNED AND
SEALED
FEB 17 1970

(SEAL)
Attest:

Edward M. Fletcher, Jr.
Attesting Officer

WILLIAM E. SCHUYLER, JR.
Commissioner of Patents